(12) United States Patent
Seok (10) Patent No.: US 9,807,685 B2
(45) Date of Patent: *Oct. 31, 2017

(54) METHOD FOR PROVIDING INFORMATION OF ACCESS POINT SELECTION

(71) Applicant: LG ELECTRONICS INC., Seoul (KR)

(72) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

This patent is subject to a terminal disclaimer.

(21) Appl. No.: 14/677,716

(22) Filed: Apr. 2, 2015

(65) Prior Publication Data

US 2015/0215862 A1    Jul. 30, 2015

Related U.S. Application Data

(63) Continuation of application No. 14/202,516, filed on Mar. 10, 2014, now Pat. No. 9,008,210, which is a
(Continued)

(30) Foreign Application Priority Data

Jul. 16, 2009  (KR) .......................... 10-2009-0064931

(51) Int. Cl.
*H04W 48/20* (2009.01)
*H04W 24/10* (2009.01)
(Continued)

(52) U.S. Cl.
CPC .......... *H04W 48/20* (2013.01); *H04B 7/0452* (2013.01); *H04W 24/10* (2013.01);
(Continued)

(58) Field of Classification Search
CPC ..... H04L 5/0053; H04L 5/005; H04L 5/0035; H04L 5/0048; H04L 5/0051;
(Continued)

(56) References Cited

U.S. PATENT DOCUMENTS 8,279,896 B2   10/2012  Etkin et al.
8,437,440 B1 *  5/2013  Zhang ................... H04L 1/0625
                                           375/366

(Continued)

FOREIGN PATENT DOCUMENTS

CN      1625867 A      6/2005
EP      1 172 969 A2   1/2002
(Continued)

OTHER PUBLICATIONS

Du et al., "Access Point Selection Strategy for Large-scale Wireless Local Area Networks," IEEE Wireless Communications and Networking Conf., WCNC Proceedings, Mar. 11-15, 2007, Hong Kong; IEEE Operations Center, Piscataway, NJ, Mar. 1, 2007, pp. 2163-2168, XP031097542.

(Continued)

*Primary Examiner* — Kwang B Yao
*Assistant Examiner* — Ricardo Castaneyra
(74) *Attorney, Agent, or Firm* — Birch, Stewart, Kolasch & Birch, LLP (57) ABSTRACT

A method of transmitting basic service set (BSS) load information. The method according to one embodiment includes establishing, by an access point (AP), an association with at least one very high throughput (VHT) station that has successfully synchronized with the AP and that has a capability of receiving at least one spatial stream of a plurality of spatial streams transmitted via a multi user-multiple input multiple output (MU-MIMO) transmission; and broadcasting, by the AP, a beacon frame that includes
(Continued)

load information including a station count field and an antenna utilization field. The station count field indicates a number of the at least one VHT station that has successfully synchronized with the AP and that has the capability of receiving at least one spatial stream of the plurality of spatial streams. The antenna utilization field indicates information about spatial streams that are under-utilized in the MU-MIMO transmission.

14 Claims, 7 Drawing Sheets

Related U.S. Application Data continuation of application No. 13/376,109, filed as application No. PCT/KR2009/005424 on Sep. 23, 2009, now Pat. No. 8,711,968.

(60) Provisional application No. 61/183,557, filed on Jun. 3, 2009, provisional application No. 61/218,982, filed on Jun. 21, 2009.

(51) Int. Cl.
*H04W 84/12* (2009.01)
*H04B 7/0452* (2017.01)
*H04W 28/02* (2009.01)
*H04W 48/10* (2009.01)
*H04W 72/04* (2009.01)

(52) U.S. Cl.
CPC ....... *H04W 28/0215* (2013.01); *H04W 48/10* (2013.01); *H04W 72/048* (2013.01); *H04W 72/0486* (2013.01); *H04W 84/12* (2013.01)

(58) Field of Classification Search
CPC . H04L 27/2655; H04B 7/0452; H04B 7/0413; H04W 48/16; H04W 48/20; H04W 48/10; H04W 16/14; H04W 72/046; H04W 72/12; H04W 72/0486; H04W 72/048; H04W 56/001; H04W 24/10; H04W 84/12
See application file for complete search history.

(56) References Cited

U.S. PATENT DOCUMENTS

| | | |
|---|---|---|
| 2004/0039817 A1 | 2/2004 | Lee et al. |
| 2005/0030922 A1 | 2/2005 | Lee et al. |
| 2005/0078625 A1 | 4/2005 | Yang et al. |
| 2005/0111419 A1 | 5/2005 | Kwon et al. |
| 2006/0045048 A1 | 3/2006 | Kwon et al. |
| 2006/0056316 A1 | 3/2006 | Chandra et al. |
| 2007/0223402 A1 | 9/2007 | Waxman |
| 2007/0268859 A1 | 11/2007 | Yao et al. |
| 2008/0102852 A1* | 5/2008 | Du .................. H04W 48/20 455/453 |
| 2009/0154427 A1* | 6/2009 | Lee .................. H04B 7/04 370/335 |
| 2010/0246546 A1* | 9/2010 | Sung ................ H04B 7/0691 370/338 |
| 2013/0028122 A1 | 1/2013 | Ma et al. |

FOREIGN PATENT DOCUMENTS

| | | |
|---|---|---|
| JP | 2006-287631 A | 10/2006 |
| KR | 10-2005-0034342 A | 4/2005 |
| KR | 10-0674861 B1 | 1/2007 |
| KR | 10-0691442 B1 | 3/2007 |
| WO | 03/088578 A1 | 10/2003 |
| WO | WO 2008/140216 A1 | 11/2008 |

OTHER PUBLICATIONS

Ho et al., "Joint Proposal for 802.11E QoS Enhancements," IEEE 802.11-00/120; May 11, 2000, pp. 1-57, XP017693755.

* cited by examiner

| Element ID | Length | Channel Correlation Threshold | Number of Correlated STAs | Number of Uncorrelated STAs | Channel Utilization Correlated STA | Channel Utilization Uncorrelated STA |
|---|---|---|---|---|---|---|
| 810 | 820 | 830 | 840 | 850 | 860 | 870 |
| 1 | 1 | 1 | 1 | 1 | 1 | 1 |

Octets:

| Element ID | Length | Number of STAs | Number of Legacy STAs | Channel Utilization of STA | Channel Utilization of legacy STA | Antenna Utilization of STA | Bandwidth Utilization of STA |
|---|---|---|---|---|---|---|---|
| 1310 | 1320 | 1330 | 1340 | 1350 | 1360 | 1370 | 1380 |
| 1 | 1 | 1 | 1 | 1 | 1 | 1 | 1 |

Octets:

Fig. 13

METHOD FOR PROVIDING INFORMATION OF ACCESS POINT SELECTION

CROSS REFERENCE TO RELATED APPLICATIONS

This application is a Continuation of U.S. patent application Ser. No. 14/202,516 filed on Mar. 10, 2014, which is Continuation of U.S. patent application Ser. No. 13/376,109 filed on Jan. 5, 2012, which is a National Phase of PCT Application No. PCT/KR2009/005424 filed on Sep. 23, 2009, which claims priority under 35 U.S.C. §119(e) to U.S. Provisional Application Nos. 61/183,557 filed on Jun. 3, 2009, and 61/218,982 filed on Jun. 21, 2009, and under 35 U.S.C. §119(a) to Patent Application No. 10-2009-0064931 filed in the Republic of Korea on Jul. 16, 2009, all of which are hereby expressly incorporated by reference into the present application.

BACKGROUND OF THE INVENTION

Field of the Invention

The present invention relates to a wireless local area network (WLAN), and more particularly, to a method for providing a terminal with information of access point (AP) selection in a WLAN system, a method for selecting an AP, and a station for supporting the methods.

Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted.

In the initial WLAN technology, a frequency of 2.4 GHz was used according to the IEEE 802.11 to support a data rate of 1 to 2 Mbps by using frequency hopping, spread spectrum, infrared communication, etc. Recently, the development of a wireless communication technique applies orthogonal frequency division multiplex (OFDM) or the like to the WLAN to support a data rate of up to 54 Mbps.

In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

In the WLAN system, a terminal used as a non-AP station performs a scanning process to find an accessible AP. The scanning process is a process in which the terminal obtains information on each AP and a list of candidate APs to which the terminal is associated in a subsequent process (i.e., an association process) so that the terminal becomes a member of a specific extended service set (ESS).

If terminals having a high channel correlation are associated with the same AP, it is difficult for the AP to provide a service simultaneously to the plurality of terminals having a high channel correlation. Therefore, when a terminal selects an AP, it is advantageous to select an AP not associated with a terminal having a high channel correlation. The scanning process may be used in order for the terminal to obtain information indicating whether other terminals having a high channel correlation are associated with a certain AP. By performing such a scanning process, the terminal can further effectively select the AP.

SUMMARY OF THE INVENTION

The present invention provides a method of selecting an access point (AP) in a wireless local area network (WLAN) system capable of using information indicating whether the AP can simultaneously support several terminals when a terminal selects a to-be-accessed AP from a plurality of candidate APs, and a terminal supporting the method.

The present invention also provides a method capable of collectively considering an amount of available radio resources when a terminal selects an AP, and a terminal supporting the method.

According to an aspect of the present invention, a method for providing information of access point (AP) selection in a wireless local area network (WLAN) system, the method includes: receiving from candidate APs the AP selection information comprising channel correlation information for other stations associated with the candidate APs; and selecting one AP from candidate APs according to the channel correlation information corresponding to the candidate APs.

According to another aspect of the present invention, a method for providing information of access point (AP) selection, the method includes: receiving from candidate APs the AP selection information indicating radio resource utilization of other stations associated with the candidate APs; selecting one AP from the candidate APs according to the AP selection information.

According to embodiments of the present invention, a terminal can select an access point (AP) capable of providing a better quality of service. A relationship of other terminals currently accessed to the AP can be taken into account in addition to AP selection information conventionally considered. In particular, a channel correlation can be considered to minimize factors of interference generated by other terminals. Further, a gain of multi-user multiple input multiple output (MIMO) can be increased by associating simultaneously supportable terminals with the same AP.

In addition, an AP is selected by collectively considering not only information on channel utilization but also information suitable for a multiple-antenna environment, so that a suitable AP can be selected by calculating an amount of actually available radio resources among all radio resources.

In addition, AP selection information is provided by directly using conventional passive scanning or active scanning, thereby reducing an overhead caused by generation of additional signaling.

In addition, a problem of omitting legacy stations in a determination or consideration operation in a process of AP selection can be avoided.

DETAILED DESCRIPTION OF THE INVENTION

Hereinafter, exemplary embodiments of the present invention will be described in detail with reference to the accompanying drawings. Although a wireless local area network (WLAN) system will be described as an example in the embodiments described below among wireless communication systems, this is for exemplary purposes only. Therefore, the following embodiments of the present invention can equally apply to other wireless communication systems in addition to the WLAN system unless it is not allowed by nature. Terms or words used in the following embodiments are unique to the WLAN system, but may be modified to other suitable terms or words customarily used in the WLAN system.

Figure 1:
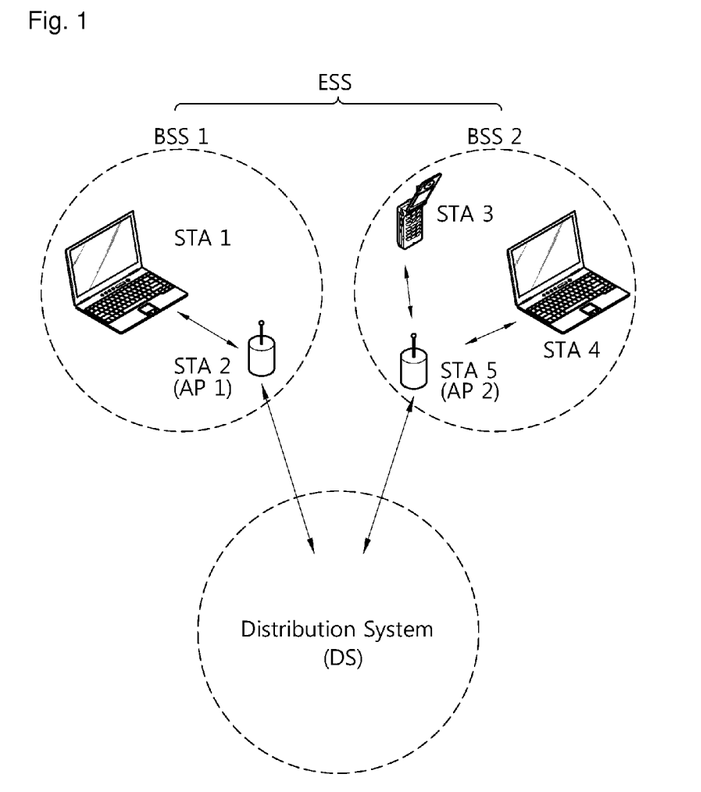
FIG. 1 is a schematic view showing an example of a wireless local area network (WLAN) system according to an embodiment of the present invention.

FIG. 1 is a schematic view showing an example of a WLAN system according to an embodiment of the present invention.

Referring to FIG. 1, the WLAN system includes one or more basis service sets (BSSs). The BSS is a set of stations (STAs) which are successfully synchronized to communicate with one another, and is not a concept indicating a specific region. The BSS can be classified into an infrastructure BSS and an independent BSS (IBSS).

Infrastructure BSSs (i.e., BSS 1 and BSS 2) include one or more STAs, access points (APs) which are STAs providing a distribution service, and a distribution system (DS) associating a plurality of APs. On the other hand, the IBSS does not include APs, and thus all STAs are mobile STAs. In addition, the IBSS constitutes a self-contained network since access to the DS is not allowed. The embodiment of the present invention is not directly related to the IBSS.

The STA is an arbitrary functional medium including a medium access control (MAC) and wireless-medium physical layer (PHY) interface conforming to the institute of electrical and electronics engineers (IEEE) 802.11 standard, and includes both an AP and a non-AP STA in a broad sense. The non-AP STA is an STA which is not an AP. For example, terminals operated by users are non-AP STAs (i.e., STA 1, STA 3, STA 4, STA 5. A non-AP STA may be simply referred to as an STA.

STA for wireless communication includes a processor and a transceiver, and also includes a user interface, a display element, etc. The processor is a functional unit devised to generate a frame to be transmitted through a wireless network or to process a frame received through the wireless network, and performs various functions to control STAs. The transceiver is functionally associated with the processor and is a functional unit devised to transmit and receive a frame for the STAs through the wireless network.

[The non-AP STA may also be referred to as a wireless transmit/receive unit (WTRU), a user equipment (UE), a mobile station (MS), a mobile terminal, a mobile subscriber unit, etc.

The AP is a functional entity for providing connection to the DS through a wireless medium for an STA associated with the AP. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc.

As described above, the STA can select the AP by performing a scanning process. There are two types of scanning. One is passive scanning, and the other is active scanning. Information required by the STA for AP selection can be transmitted by performing the passive scanning or the active scanning. Hereinafter, the conventional passive scanning and active scanning will be described in brief.

A first scheme is the passive scanning using a beacon frame transmitted from an AP. According to the passive scanning, a terminal which intends to become a member of a specific BSS receives a beacon frame periodically transmitted by the AP and thus can obtain a list of candidate APs and information on each candidate AP. In this case, the candidate APs transmit a beacon frame including a service set ID (SSID) identical to an ID of a to-be-accessed BSS.

A second scheme is the active scanning. According to the active scanning, a terminal which intends to become a member of a specific BSS first transmits a probe request frame. The probe request frame includes a to-be-accessed SSID. Upon receiving the probe request frame, each AP transmits a probe response frame including a variety of information to the terminal if its SSID coincides with the SSID included in the received probe request frame. Therefore, the terminal can obtain the list of candidate APs by using the received probe response frame.

Additional information obtained to allow the STA to be able to select the AP according to the embodiment of the present invention may be included in any one field or an information element (IE) included in a beacon frame, a probe request frame, and/or a probe response frame. The additional information obtained for AP selection can be expressed without restriction.

Figure 2:
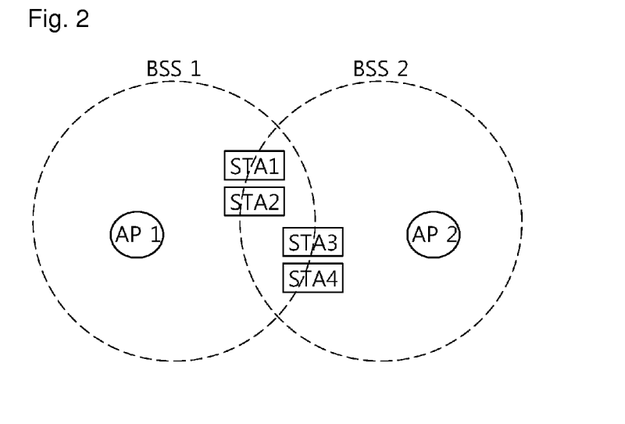
FIG. 2 shows a WLAN system in an overlapping basic services set (OBSS) environment capable of providing access point (AP) selection information according to an embodiment of the present invention.

FIG. 2 shows a WLAN system in an overlapping basic services set (OBSS) environment capable of providing AP selection information according to an embodiment of the present invention. In the OBSS environment, a plurality of BSSs are located in a specific region, and an overlapping region exists between the BSSs.

The WLAN system of FIG. 2 includes a BSS 1 and a BSS 2, and has an overlapping portion between them. An AP corresponding to the BSS 1 is an AP 1. An AP corresponding to the BSS 2 is an AP 2. The AP 1 and the AP 2 are candidate APs. An STA 1, an STA 2, an STA 3, and an STA 4 exist in an overlapping region between the BSS 1 and the BSS 2. The STA 1 and the STA 2 have a high channel correlation with each other. The STA 3 and the STA 4 have a high channel correlation with each other.

The channel correlation between STAs may imply a degree of influence existing between channels corresponding to the respective STAs. For example, when a degree of influence is high since interference occurs in a channel of the STA 2 due to communication with the STA 1, the STA 1 and the STA 2 have a high channel correlation with each other.

A multiple-antenna communication system includes link reliability or system capacity by using a transmit/receive diversity scheme, a spatial multiplexing scheme, a beamforming scheme, etc., according to a characteristic of a service and a channel environment. Such a multiple-antenna communication system is sensitive to a spatial channel environment. In case of using the diversity scheme, the lower the channel correlation between links of each STA, the higher the performance. In an actual channel environment, however, various correlations exist between antennas, which may be significantly different from an ideal case. And hereinafter, in the embodiment of present invention, multiple-antenna communication system may mean a communication system in which multiple spatial streams can be transmitted. And the 'antenna' in the present invention may be a virtual antenna. However, the scope of the present invention is not limited by the meaning of the antenna, whether the antenna is a virtual antenna or a physical antenna.

In terms of distance, the STA 1 and the STA 2 are located close to the AP 1, and the STA 3 and the STA 4 are located close to the AP 2. In this case, however, the AP 1 cannot simultaneously provide services to the STA 1 and the STA 2, and the AP 2 cannot simultaneously provide services to the STA 3 and the STA 4. Therefore, when providing services, the STA 1 and the STA 3 are preferably associated with the AP 1, and the STA 2 and the STA 4 are preferably associated with the AP 2.

That is, information to be basically considered in AP selection of STAs may be information on a distance between the AP and the STA, a BSS load, channel quality, etc. Information on the BSS load includes information on channel utilization. Information on a channel correlation between STAs associated with the AP will be additionally considered in the embodiment of the present invention.

As such, in an AP selection mechanism, only STAs which can simultaneously receive services from one AP are associated with the same AP by considering a channel correlation with other STAs, and thus a gain of multi-user multiple input multiple output (MIMO) can be increased.

Figure 3:
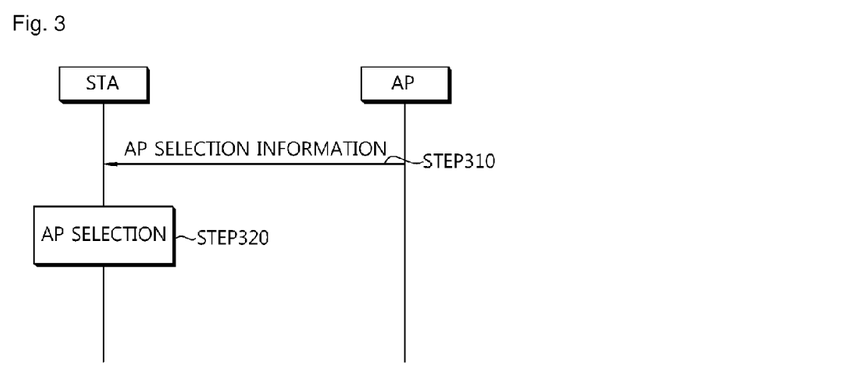
FIG. 3 is a flowchart showing a method for providing AP selection information according to an embodiment of the present invention.

FIG. 3 is a flowchart showing a method for providing AP selection information according to an embodiment of the present invention. The embodiment of FIG. 3 can be achieved by active scanning.

An STA receives AP selection information from an AP (step 310). Herein, a candidate AP is an AP which receives the AP selection information until the STA selects one AP. The AP selection information includes channel correlation information of other STAs associated with the AP. The channel correlation information may include at least one of a reference value for determining whether a channel correlation of other STAs is low or high, the number of STAs having a high correlation according to a determination result, a channel utilization of STAs determined to have a high channel correlation, etc.

Upon receiving the AP selection information from the AP, the STA determines whether to select the AP by using channel correlation information of the STAs associated with the AP (step 320). By using AP selection information corresponding to several APs, the STA can possibly select an AP not associated with an STA having a high channel correlation, and then can access to the AP.

Figure 4:
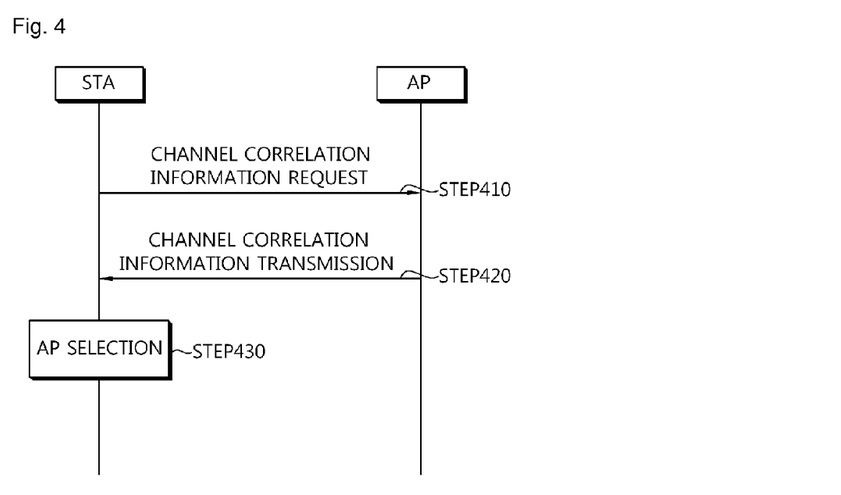
FIG. 4 is a flowchart showing a method for providing AP selection information according to another embodiment of the present invention.

FIG. 4 is a flowchart showing a method for providing AP selection information according to another embodiment of the present invention. In an example described below, the AP selection information obtained by an STA from an AP is channel correlation information of STAs.

First, the STA transmits a channel correlation information request to the AP (step 410). The channel correlation information request may be transmitted to the STA by being included in a probe request. Further, the STA may announce the fact that the STA supports spatial division multiple access (SDMA) by using a probe request frame. Herein, a candidate AP is an AP which receives the AP selection information request from the STA or which transmits the AP selection information to the STA until the STA selects one AP. The same is also applied in the following description.

The probe request frame received by the AP may include a training field. Upon receiving the probe request frame including the training field, the AP performs channel estimation on a corresponding channel. The AP may generate information on a channel correlation according to a result obtained by performing channel estimation.

In response to the channel correlation information request of the STA, the AP transmits a channel correlation information response to the STA (step 420). The channel correlation information response can also be transmitted to the STA by being included in the probe response. The AP transmits channel correlation information of other STAs associated with the AP to the STA by using the channel correlation in-formation response.

That is, AP selection information depending on request of AP selection information such as channel correlation information can be obtained by transmitting a probe request and a probe response in an active scan process.

A terminal selects a to-be-accessed AP by using the received channel correlation information (step 430).

Figure 5:
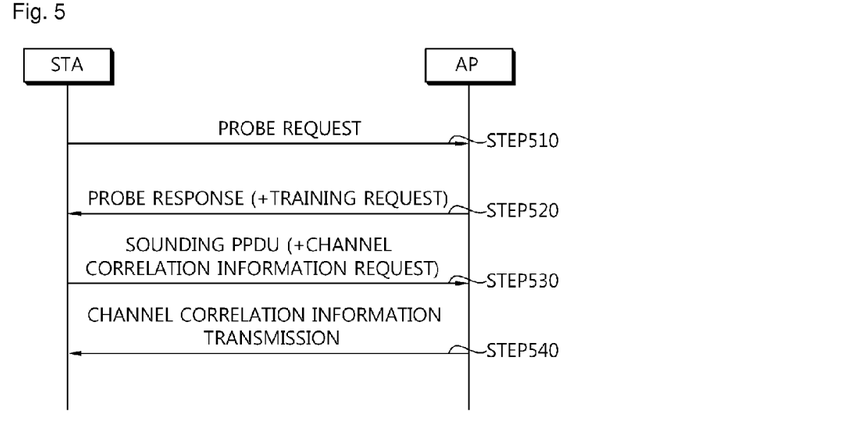
FIG. 5 is a flowchart showing a method for providing AP selection information according to another embodiment of the present invention.

FIG. 5 is a flowchart showing a method for providing AP selection information according to another embodiment of the present invention. The method for performing AP selection information according to the embodiment of the FIG. 5 can also be achieved by active scanning.

An STA transmits a probe request to an AP (step 510). The AP transmits a probe response in response to the probe request, wherein the probe response transmitted by the AP includes a training request (step 520).

The STA transmits a sounding physical layer convergence procedure (PLCP) protocol data unit (PPDU) to the AP according to the training request included in the probe response (step 530). The sounding PPDU is a PPDU transmitted so that a transmitting side allows a receiving side to be able to estimate a channel between the transmitting side and the receiving side. When a sounding parameter value of a transmission vector or a reception vector is 'sounding', a PPDU used in that case is referred to as a sounding PPDU.

After transmission of the probe request and the probe response, the sounding PPDU may be transmitted by using a training request included in the probe response, or may be transmitted in a state where the probe request is included in the sounding PPDU. A channel correlation information request is included in the sounding PPDU in any cases in the embodiment of the present invention.

Herein, when the STA transmits the sounding PPDU to the AP, the STA transmits the sounding PPDU by including the channel correlation information request into the sounding PPDU. Then, while receiving the sounding PPDU, the AP transmits AP selection information including the channel correlation information to the STA in response to the channel correlation information request of the STA (step 540). In another embodiment of the present invention, the channel correlation information request and the sounding PPDU are separately transmitted. The channel correlation information request frame is first transmitted, followed by the sounding PPDU.

Figure 6:
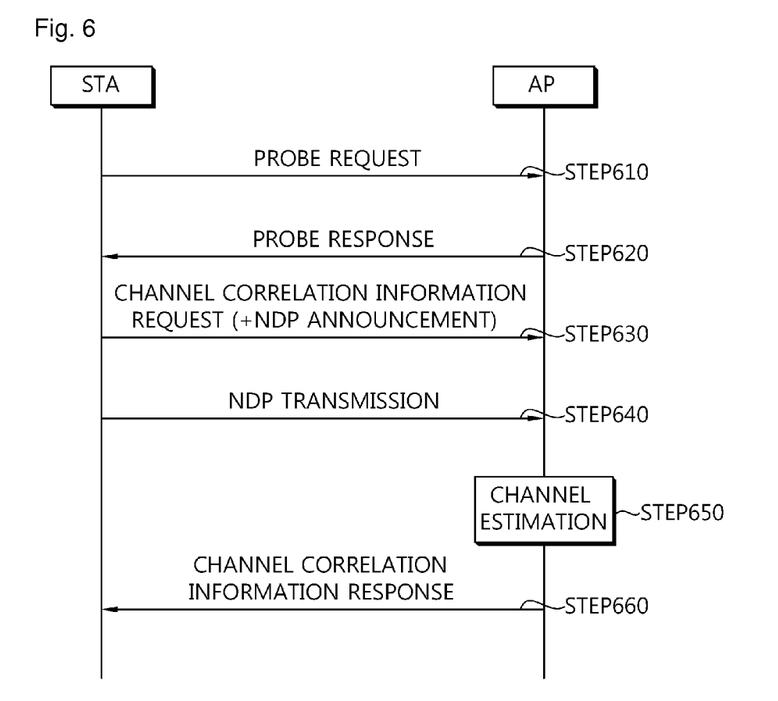
FIG. 6 is a flowchart showing a method for providing AP selection information according to another embodiment of the present invention.

FIG. 6 is a flowchart showing a method for providing AP selection information according to another embodiment of the present invention. A null data packet (NDP) is used in the method for providing AP selection information according to the embodiment of FIG. 6. An AP is any one of candidate APs. An STA transmits a probe request frame to the AP (step 610). The probe request frame may be broadcast. Upon receiving the probe request from the STA, the AP responds to the STA by transmitting a probe response frame (step 620).

Upon receiving the probe response frame from the AP, the STA transmits a channel correlation information request to obtain channel correlation information from the AP (step 630). The channel correlation information request may have a format of a channel correlation request management action frame.

The channel correlation request management action frame corresponds to a public action frame. The public action frame is an action management frame that can be transmitted and received before the STA and the AP are associated with each other. Therefore, even in a state where the STA is not associated with the AP, the STA can transmit and receive an action management frame (i.e., a request management action frame and a response management action frame to be described below) to and from the AP.

When the STA requests the AP to transmit the channel correlation information, a null data packet (NDP) announcement field may be set in an MAC header of the channel correlation management action frame. That is, an NDP announcement can be transmitted together with the channel correlation information request. For example, by setting the NDP announcement field in a control field (e.g., a high throughput (HT) control field or a very high throughput (VHT) control field) of the MAC header, the STA announces to the AP that an NDP will be transmitted to the AP subsequent to transmission of the channel correlation information request.

The NDP is a PPDU in which only a PHY header is transmitted and in which a physical layer service data unit (PSDU) is null.

Null data is one of MAC data types of IEEE 802.11. The null data has neither a MAC header nor a data unit, and thus the null data has neither a sources address nor a destination address. Therefore, the null data has to be continuously transmitted immediately subsequent to transmission of a non-NDP PPDU.

Herein, the non-NDP PPDU implies a general PPDU rather than an NDP. Of course, a message for an AP selection information request or a channel correlation request management action frame, and a channel correlation response management action frame also correspond to the non-NDP PPDU. The NDP has to be transmitted immediately subsequent to transmission of the non-NDP PPDU, and in this case, an NDP announcement has to be included in the non-NDP PPDU transmitted prior to the transmission of the NDP. That is, the STA has to announce to the AP the fact that the NDP will be transmitted by using the NDP announcement immediately prior to the transmission of the NDP.

For example, according to 802.11m, the NDP announcement may be performed by setting a corresponding bit of the HT control field to 1. A source address and a destination address of the frame including the NDP announcement are a source address and a destination address of the NDP.

A length field of a PLCP header is set to 0 in the NDP. It can be seen that the NDP also corresponds to one sounding PPDU, and is used for channel estimation. After NDP announcement, the STA transmits the NDP to the AP (step 640).

Upon receiving the NDP, the AP estimates a channel between the STA and the AP (step 650). The AP calculates a channel correlation for the STA according to a result of channel estimation, and generates channel correlation information to be provided to the STA.

Then, in response to the channel correlation request management action frame received from the STA in step 630, the AP transmits the previously generated channel correlation information to the STA (step 660). The channel correlation information can be transmitted in a form of a channel correlation response management action frame. The channel correlation response management action frame also corresponds to one of public action frames, and channel correlation information is included in the channel correlation response management action frame. Of course, the channel correlation in-formation may be one example of AP selection information provided by the AP to the STA or information included in the AP selection information.

Figure 7:
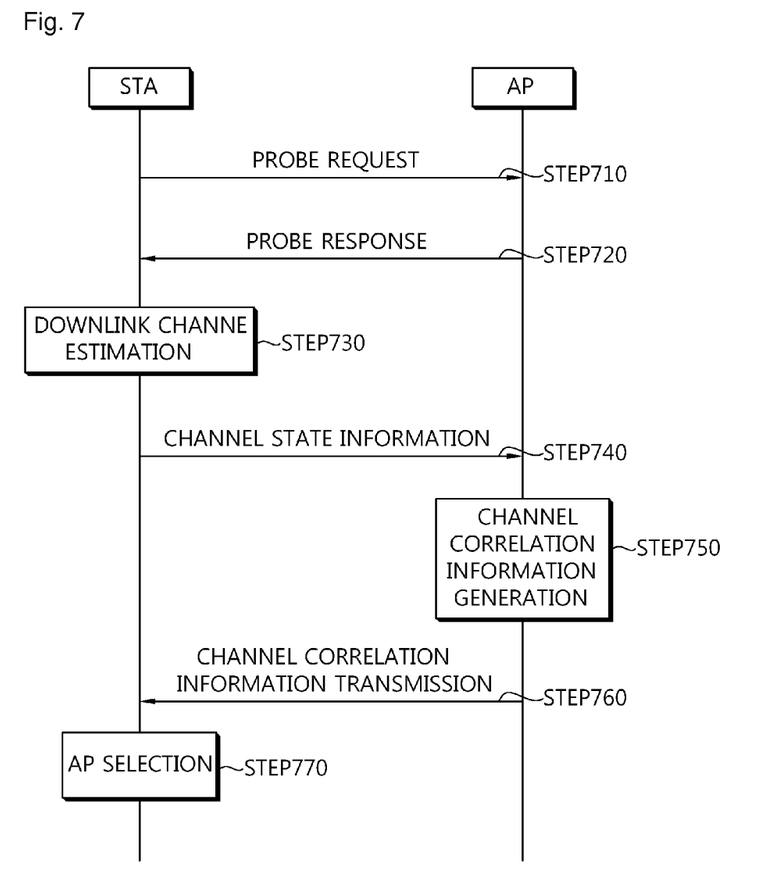
FIG. 7 shows a method for providing AP selection information according to another embodiment of the present invention.

FIG. 7 shows a method for providing AP selection information according to another embodiment of the present invention. The method for providing AP selection in-formation according to the embodiment of FIG. 7 can also be achieved by active scanning First, an STA transmits a probe request to an AP, wherein the probe request includes a training request (step 710). In response to the probe request of the STA, the AP transmits a probe response to the STA (step 720). While receiving the probe response, the STA performs channel estimation on a downlink channel (step 730).

That is, a channel estimation request may be included in the probe response transmitted by the AT to the STA. The channel estimation request may correspond to a 'training field' transmitted from the STA to the AP by being included in the probe request described above with reference to FIG. 4. Accordingly, the STA performs channel estimation. Unlike in the aforementioned embodiment, channel estimation is performed on the downlink channel directly by the STA not the AP.

Then, the STA transmits channel estimation information or channel state information generated according to a result of the channel estimation to the AP (step 740). Upon receiving the channel estimation information from the STA, the AP calculates a channel correlation by using the received channel estimation information (step 750). Therefore, the AP generates channel correlation information of the STA according to the result of channel estimation. Then, the AP transmits the channel correlation information to the STA (step 760). The STA can select the AP according to the channel correlation information (step 770).

Figure 8:
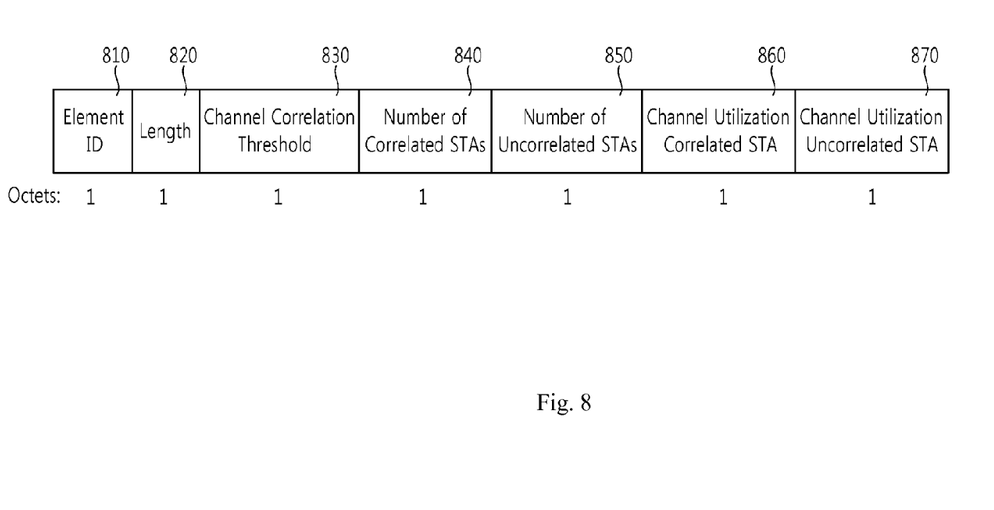
FIG. 8 shows a frame format of AP selection information transmitted according to an embodiment of the present invention.

FIG. 8 shows a frame format of AP selection information transmitted according to an embodiment of the present invention. The AP selection information of FIG. 8 may be used as an example of channel correlation information of STAs as described above. A frame format of the channel correlation information may be referred to as a channel correlation information (CCI) frame format.

According to the CCI frame format shown in FIG. 8, the AP selection information includes an Element ID field 810, a Length field 820, a Channel Correlation Threshold field 830, a Number of Correlated STAs field 840, a Number of Uncorrelated STAs field 850, a Channel Utilization of Correlated STA field 860, and a Channel Utilization of Uncorrelated STA field 870.

The Element ID field 810 may indicate that a frame is used for transmission of channel correlation information. The Length field 820 may indicate length information of the frame.

The Channel Correlation Threshold field 830 includes a channel correlation threshold which is a reference value for determining whether a channel correlation of a certain STA is high or low. The Channel Correlation Threshold field 830 may be included when a channel correlation of the STA is recognized by using a threshold. According to another embodiment, an STA having a high correlation and an STA having a low correlation can be identified without having to use the threshold.

Hereinafter, for convenience of explanation, an STA having a high channel correlation with respect to an STA intending to select the AP may be referred to as a correlated STA, and an STA having a low channel correlation may be referred to as an uncorrelated STA. Of course, in comparison with a channel correlation threshold of the Channel Correlation Threshold field 830, an STA having a higher channel correlation may be referred to as a correlated STA, and an STA having a lower channel correlation may be referred to as an uncorrelated STA.

The Number of Correlated STAs field 840 indicates the number of STAs which are determined to have a high channel correlation by a specific criterion among STAs associated with the AP. Therefore, a quality of service may decrease when a large number of correlated STAs are associated with the AP, wherein the number of correlated STAs is indicated in the Number of Correlated STAs field 840. On the contrary, the Number of Uncorrelated STAs field 850 indicates the number of STAs classified into an STA having a low channel correlation by a specific criterion among the STAs associated with the AP.

The Channel Utilization of Correlated STA field 860 indicates channel utilization of correlated STAs associated with the AP, and indicates how many portions of all channels or all radio resources are occupied or used by the correlated STAs.

On the other hand, the Channel Utilization of Uncorrelated STA field 870 indicates channel utilization of uncorrelated STAs associated with the AP, and indicates how many portions of all channels or all radio resources are occupied or used by the correlated STAs.

By including the Channel Utilization of Correlated STA field 860 and the Channel Utilization of Uncorrelated STA field 870, the STA can select the AP by considering not only channel quality, a BSS load, and channel correlations of other STAs but also channel utilization depending on the channel correlation.

In addition thereto, information on MAC addresses of correlated STAs to be associated with the AP may be included in a CCI frame. An MAC Address of Correlated STA field is not shown in FIG. 8.

Figure 9:
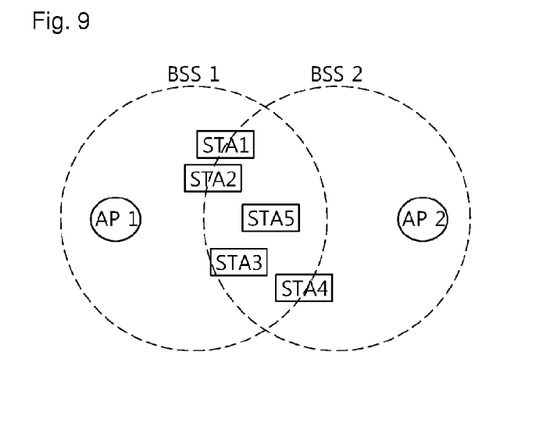
FIG. 9 shows a WLAN system capable of performing a method for providing AP selection information according to another embodiment of the present invention.

FIG. 9 shows a WLAN system capable of performing a method for providing AP selection information according to another embodiment of the present invention. An AP selection process performed by an STA 5 will be described in brief with reference to FIG. 9.

The WLAN system of FIG. 9 shows an OBSS environment where an overlapping region exists between a BSS 1 and a BSS 2. In the WLAN system of FIG. 9, there is an overlapping portion between the BSS 1 and the BSS 2. An AP 1 is an AP corresponding the BSS 1. An AP 2 is an AP corresponding to the BSS 2. The AP 1 and the AP 2 are candidate APs.

STAs 1 to 5 are located in the overlapping portion between the BSS 1 and the BSS 2. The STA 1, the STA 2, and the STA 3 are associated with the AP 1, and the STA 4 is associated with the AP 2. The STA 5 determines which AP will be selected between the AP 1 and the AP 2.

According to another embodiment of the present invention, the STA 5 selects an AP by calculating an amount of radio resources that can be practically used by the STA to determine in which case a larger amount of radio resources are used between a case where the STA 1, the STA 2, and the STA 3 use a radio resource of the AP 1 and a case where the STA 4 uses a radio resource of the AP 2.

When the STA 5 determines which AP will be selected from the AP 1 and the AP 2, the STA 5 receives AP selection information from the AP 1 and the AP 2. Each of AP selection information may be transmitted by being included in a beacon frame or a probe response frame which is broadcast or unicast by the AP 1 and the AP 2. That is, the STA 5 can obtain the AP selection information without having to request the AP 1 and the AP 2 to transmit the AP selection information. Passive scanning is used in an AP selection method according to embodiments described with reference to FIG. 9 and subsequent Figures.

Figure 10:
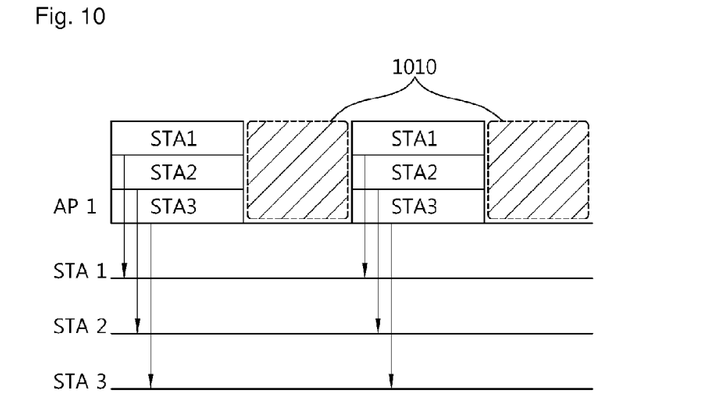
FIG. 10 and FIG. 11 show transmission opportunity (TXOP) of stations to which the method for providing AP selection information according to the embodiment of FIG. 8 is applicable.
Figure 11:
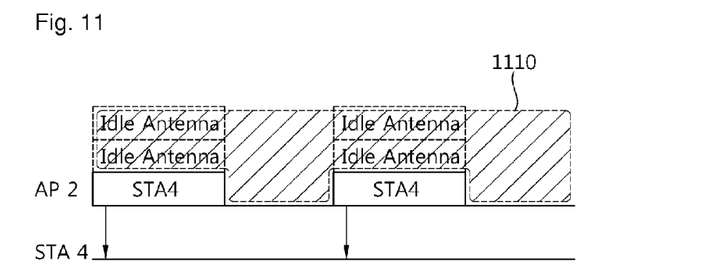

FIG. 10 and FIG. 11 show transmission opportunity (TXOP) of STAs to which the method for providing AP selection information according to the embodiment of FIG. 8 is applicable. In TXOP shown in FIG. 10, each STA is related to an AP 1 within one unit time. In TXOP shown in FIG. 11, each STA is related to an AP 2 within one unit time.

In a case where the AP 1 supports a total of 3 spatial streams and the AP 1 is associated with three STA of an STA 1, an STA 2, and an STA 3, the AP 1 transmits one spatial stream to one STA. All of the three spatial streams are respectively allocated to the STA 1, the STA 2, and the STA 3. Or the AP 1 supports a total of 3 multiple antennas and the AP 1 is associated with an STA 1, an STA 2, and an STA 3, all of the three antennas are respectively allocated to the STA 1, the STA 2, and the STA 3. A duration of the TXOP of the STA 1, the STA 2, and the STA 3 occupies about 50% of any unit time. Therefore, for convenience, an amount of radio resources that can be used when an STA 4 is associated with the AP 1 among a total amount of radio resources that can be supported by the AP 1 can be indicated by 0.5. A channel utilization is 0.5. A portion indicated by a slashed line corresponds to a total amount 1010 of radio resources that can be used when an STA 5 selects the AP 1.

In a relation with the AP 2, a duration of TXOP of the STA 4 corresponds to a length of about 75% in any unit time shown in FIG. 11. A channel utilization is 0.75. Therefore, the TXOP of the STA 4 is longer than the TXOP of the STA 1, the STA 2, and the STA 3. That is, the STA 5 selects the AP 1 when only the channel utilization is simply compared, whereas a result of AP selection may differ considering a total amount of available radio resources when accessing to the AP 2.

In a case where the AP 2 supports a total of 3 spatial streams and only the STA 4 is associated with the AP 2, AP transmits only one spatial stream to the STA 4 among all available spatial stream of the AP 2 and the remaining two spatial streams stay in an idle state. In other words, only one antenna may be allocated to the STA 4 among all antennas of the AP and the remaining two antennas stay in a state of an idle antenna. A portion indicated by a slashed line corresponds to a total amount 1110 of radio resources that can be used when the STA 5 selects the AP 2. It can be seen that the total amount 1110 of radio resources that can be used when the STA 5 selects the AP 2 is greater than the total amount 1010 of radio resources that can be used when the STA 5 selects the AP 1.

That is, although TXOP of STAs associated with the AP 1 is shorter than TXOP of an STA associated with the AP 2, it can be seen that the STA 5 preferably selects the AP 2 rather than the AP 1 by considering bandwidth utilization and/or antenna utilization of the STAs.

Figure 12:
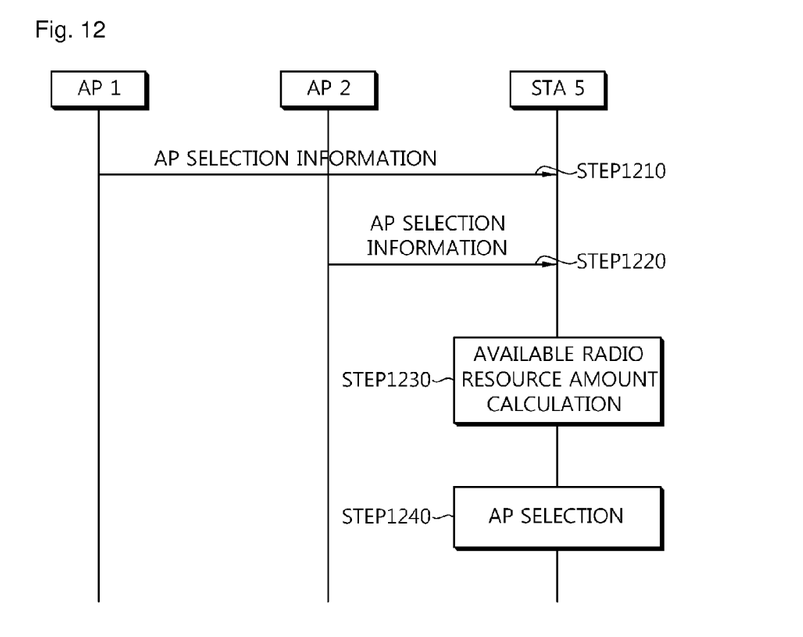
FIG. 12 is a flowchart showing a method for providing AP selection information according to the embodiment of FIG. 9 to FIG. 11.

FIG. 12 is a flowchart showing a method for providing AP selection information according to the embodiment of FIG. 9 to FIG. 11.

An STA receives AP selection information from neighboring candidate APs. Herein, an STA for selecting an AP is the STA 5 of FIG. 9 and FIG. 11, and the candidate APs are the AP 1 and the AP 2. Therefore, the STA 5 receives the AP selection information from the AP 1 and the AP 2 (step 1210 and step 1220). The AP selection information may be transmitted by being included in a beacon frame or a probe response frame.

The AP 1 and the AP 2 broadcast or unicast a beacon frame or a probe response frame. The STA 5 can obtain AP selection information on the AP 1 and the AP 2 by receiving the beacon frame or the probe response frame from the AP 1 and the AP 2.

The AP select information received by the STA 5 from the AP 1 and the AP 2 in the embodiment of FIG. 12 is different to some extent from channel correlation in-formation described in the previous embodiment. The AP selection information includes bandwidth utilization information or antenna utilization information of STAs associated with one AP. The bandwidth utilization information is information indicating a length of a channel bandwidth currently used among a full channel bandwidth.

That is, the AP 1 transmits to the STA 5 the antenna utilization information of STAs (i.e., STA 1, STA 2, and STA 3) associated with the AP 1, and the AP 2 transmits to the STA 5 the antenna utilization information of an STA (i.e., STA 4) associated with the AP 2. Of course, the AP selection information transmitted by the AP 1 and the AP 2 to the STA 5 may include channel utilization of STAs associated with each AP. As described above, the AP selection information according to the embodiment of the present invention may further include information on a channel bandwidth used by STAs associated with a corresponding AP.

Upon receiving the AP selection information from the AP 1 and the AP 2, the STA 5 calculates an amount of radio resources that can be used when associated with the AP 1 and the AP 2 by using the antenna utilization information or the bandwidth utilization information of the AP 1 and the AP 2 (step 1230). The calculation process has been described with reference to FIG. 10 and FIG. 11. In the present embodiment, the STA 5 selects the AP 2 by determining that an amount of radio resources which can be used when associated with the AP 2 is greater as a result of the calculation process (step 1240).

Figure 13:
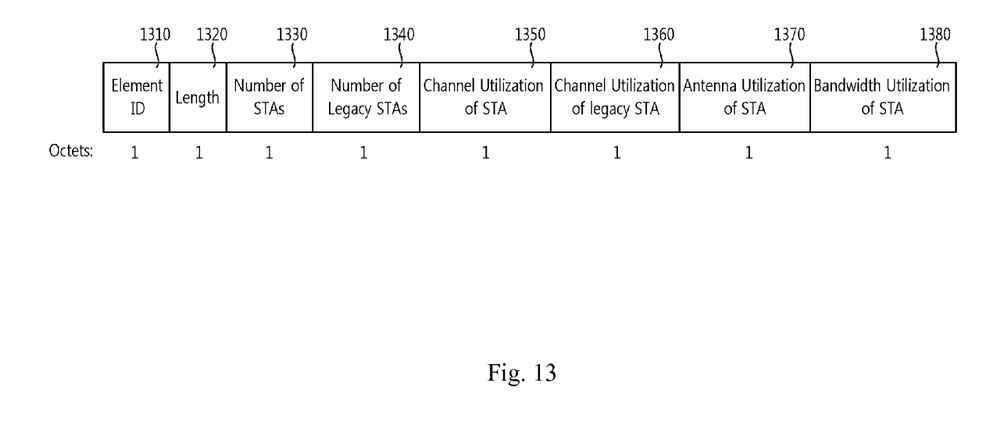
FIG. 13 shows an example of a frame format of AP selection information provided to a station in the method for providing the AP selection information according to the embodiment described with reference to FIG. 9 to FIG. 11.

FIG. 13 shows an example of a frame format of AP selection information provided to an STA in the method for providing the AP selection information according to the embodiment described with reference to FIG. 9 to FIG. 11.

According to the frame format of the AP selection information shown in FIG. 13, the AP selection information includes an Element ID field 1310, a Length field 1320, a Number of STAs field 1330, a Number of Legacy STAs field 1340, a Channel Utilization of STAs field 1350, a Channel Utilization of Legacy STAs field 1360, an Antenna Utilization of STAs field 1370, a Bandwidth Utilization of STAs field 1380, etc.

Herein, in case of using a legacy STA, multiple antennas are not supported, and a supported channel bandwidth may be narrower than those of general STAs not the legacy STA. Therefore, STAs are differentiated from the legacy STA in the present embodiment. For example, it can be understood that the STA denotes a VHT STA of a VHT WLAN system, and the legacy STA is a non-VHT STA of the VHT WLAN system.

The VHT WLAN system has been proposed to meet a demand on a new WLAN system supporting a higher throughput than a data processing speed supported by IEEE 802.11n. The VHT WLAN system is one of IEEE 802.11 WLAN systems which have recently been proposed to support a data processing speed of 1 Gbps or more. The VHT WLAN system is named arbitrarily. To provide a throughput of 1 Gbps or more, a feasibility test is currently being conducted for a system which uses 4?4 MIMO and a channel bandwidth of 80 MHz or more.

For example, in the VHT WLAN system, the VHT STAs support a channel bandwidth of 80 MHz and multiple spatial streams or multiple antennas. However, the non-VHT STA that is the legacy STA may support only a single spatial stream or single antenna with a channel bandwidth of 20 MHz. Therefore, for convenience of explanation, the legacy STA is differentiated when explaining the present embodiment in which bandwidth utilization and antenna utilization are used as AP selection information.

The Element ID field 1310 and the Length field 1320 respectively indicate a purpose or role of a frame and a length of the frame.

The Number of STAs field 1330 indicates the number of STAs associated with a corresponding AP. In the VHT WLAN system for example, the Number of STAs field 1330 indicates the number of VHT STAs associated with a corresponding VHT AP. Further, the Number of Legacy STAs field 1340 indicates the number of legacy STAs associated with a corresponding AP.

In the VHT WLAN system for example, a time in which multiple spatial streams or multiple antennas can be used decreases when the number of non-VHT STAs that are legacy STAs increases, and a supported bandwidth decreases during a time in which the AP communicates with the legacy STA. Therefore, the number of legacy STAs can also be information required to calculate a total amount of radio resources that can be used when a specific AP is selected by an STA intending to select the AP.

The Channel Utilization of STAs field 1350 indicates channel utilization of STAs associated with the AP. The STA intending to select the AP can know which channel is used by each STA associated with the AP and can know a channel which is already occupied by other STAs by using the Channel Utilization of STAs field 1350.

The Channel Utilization of Legacy STAs field 1360 indicates channel utilization of legacy STAs associated with the AP. The STA intending to select the AP can know a specific channel used by the legacy STAs which are already associated with the AP and can know a specific channel and how many portions of the channel are occupied and used.

The Antenna Utilization of STAs field 1370 may indicate which spatial stream is already allocated to the other STAs communicating with the AP. The Antenna Utilization of STAs field 1370 may also indicate a specific antenna through which other STAs already associated with a corresponding AP communicate with the AP among several antennas of the AP. For example, if the AP is a VHT AP, since the VHT AP supports a multiple-spatial stream system, a spatial stream in use may coexist with a spatial stream that can be used by an STA to be newly associated. Therefore, the STA recognizes antenna utilization of candidate antennas or available spatial stream, and thus can select the AP by considering which spatial stream can be used in an idle mode and by considering which spatial stream is already being used. Likewise, the STA can select the AP by considering which antenna or how many antennas can be used in an idle mode and by considering which antenna is already being used.

The Bandwidth Utilization of STAs field 1380 can also be explained by taking a case where the AP is the VHT AP for example. When the AP supports a wide frequency band, several STAs can share a channel bandwidth by being simultaneously associated with the AP. Therefore, some portions of a full channel bandwidth are in use, and the remaining portions thereof are in the idle mode. Accordingly, the STA intending to select the AP can obtain information indicating a length of a channel bandwidth not in use at the moment or information indicating to which band the channel bandwidth belongs from the Bandwidth Utilization of STAs field 1380, and thus can apply the obtained information to the AP selection process.

All functions described above may be performed by a processor such as a microprocessor, a controller, a microcontroller, an application specific integrated circuit (ASIC) or a processor of a terminal according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting basic service set (BSS) load information in a wireless local area network, the method comprising:
   establishing, by an access point (AP), an association with at least one very high throughput (VHT) station that has successfully synchronized with the AP and that has a capability of receiving at least one spatial stream of a plurality of spatial streams transmitted via a multi user-multiple input multiple output (MU-MIMO) transmission; and
   broadcasting, by the AP, a beacon frame that includes load information including a station count field and an antenna utilization field,
   wherein the station count field indicates a number of the at least one VHT station that has successfully synchronized with the AP and that has the capability of receiving the at least one spatial stream of the plurality of spatial streams transmitted via the MU-MIMO transmission, and
   wherein the antenna utilization field indicates information about an under-utilization of spatial streams in the MU-MIMO transmission.

2. The method of the claim 1, wherein the load information further includes a bandwidth utilization field that indicates information about a utilization of a bandwidth.

3. The method of claim 1, wherein the at least one VHT station is capable of supporting a bandwidth of 80 MHz or more.

4. The method of the claim 1, wherein the station count field has one octet in length and the antenna utilization field has one octet in length.

5. A device configured to transmit basic service set (BSS) load information in a wireless local area network, the device comprising:
   a communication device; and
   a processor operatively connected to the communication device and configured to:
      establish an association with at least one very high throughput (VHT) station that has successfully synchronized with the device that has a capability of receiving at least one spatial stream of a plurality of spatial streams transmitted via a multi user-multiple input multiple output (MU-MIMO) transmission, and
      instruct the communication device to broadcast a beacon frame that includes load information including a station count field and an antenna utilization field,
   wherein the station count field indicates a number of the at least one VHT station that has successfully synchronized with the device and that has the capability of receiving the at least one spatial stream of the plurality of spatial streams transmitted via the MU-MIMO transmission, and
   wherein the antenna utilization field indicates information about an under-utilization of spatial streams in the MU-MIMO transmission.

6. The device of the claim 5, wherein the load information further includes a bandwidth utilization field that indicates information about a utilization of a bandwidth.

7. The device of the claim 5, wherein the at least one VHT station is capable of supporting a bandwidth of 80 MHz or more.

8. The device of the claim 5, wherein the station count field has one octet in length and the antenna utilization field has one octet in length.

9. A method of selecting an access point (AP) in a wireless local area network system, the method comprising:
   receiving, by a scanning station from the AP a beacon frame including load information including a station count field and an antenna utilization field; and
   determining, by the scanning station based on the load information, whether a station requests association with the AP or not,
   wherein the station count field indicates a number of at least one very high throughput (VHT) station that has successfully synchronized with the AP and that has a capability of receiving at least one spatial stream of a plurality of spatial streams transmitted via a multi user-multiple input multiple output (MU-MIMO) transmission, and wherein the antenna utilization field indicates information about an under-utilization of spatial streams in the MU-MIMO transmission.

10. The method of the claim 9, wherein the load information further includes a bandwidth utilization field that indicates information about a utilization of a bandwidth.

11. The method of the claim 9, wherein the station count field has one octet in length and the antenna utilization field has one octet in length.

12. A device configured to select an access point (AP) in a wireless local area network system, the device comprising:
- a communication device; and
- a processor operatively connected to the communication device and configured to:
  - instruct the communication device to receive, from the AP a beacon frame including load information including a station count field and an antenna utilization field, and
  - determine, based on the load information, whether a station requests association with the AP or not, wherein the station count field indicates a number of at least one very high throughput (VHT) station that has successfully synchronized with the AP and that has a capability of receiving at least one spatial stream of a plurality of spatial streams transmitted via a multi user-multiple input multiple output (MU-M1MO) transmission, and wherein the antenna utilization field indicates information about an under-utilization of spatial streams in the MU-MIMO transmission.

13. The device of the claim 12, wherein the load information further includes a bandwidth utilization field that indicates information about a utilization of a bandwidth.

14. The device of the claim 12, wherein the station count field has one octet in length and the antenna utilization field has one octet in length.

* * * * *